United States Patent
Murray et al.

(10) Patent No.: US 7,487,201 B1
(45) Date of Patent: Feb. 3, 2009

(54) METHOD AND SYSTEM FOR PROVIDING FRAMEWORK FOR JAVA BASED AJAX WEB APPLICATIONS

(75) Inventors: Gregory L Murray, Santa Clara, CA (US); Sean P Brydon, San Francisco, CA (US); Inderjeet Singh, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 404 days.

(21) Appl. No.: 11/478,911

(22) Filed: Jun. 30, 2006

(51) Int. Cl.
*G06F 15/16* (2006.01)
(52) U.S. Cl. .................. 709/201; 709/203; 709/219
(58) Field of Classification Search .......... 709/201, 709/203, 217, 218, 219, 227, 250; 710/260
See application file for complete search history.

(56) References Cited

U.S. PATENT DOCUMENTS 5,566,337 A * 10/1996 Szymanski et al. .......... 710/260
2002/0056004 A1 * 5/2002 Smith et al. ................. 709/227
2002/0120679 A1 * 8/2002 Hayton et al. ............... 709/203
2003/0046437 A1 * 3/2003 Eytchison et al. ........... 709/250
2006/0224699 A1 * 10/2006 Kruse et al. ................. 709/219
2007/0174419 A1 * 7/2007 O'Connell et al. .......... 709/217

* cited by examiner

*Primary Examiner*—Le Luu
(74) *Attorney, Agent, or Firm*—Martine Penilla Gencarella, LLP (57) ABSTRACT

A method and system for managing events associated with either the client or the server using a controller framework includes initiating a request at a client. The request triggers an event that is processed using a client controller on the client. The client controller registers the event on the client, forwards the event to a server controller on a server, polls the server controller on the server periodically for information related to the event and retrieves notifications in response to the request or upon a poll. The client controller communicates with the server controller using asynchronous communication. The response retrieved by the client controller is loaded onto the browser of the client dynamically and rendered at the client as and when notifications are received from the server.

17 Claims, 7 Drawing Sheets

METHOD AND SYSTEM FOR PROVIDING FRAMEWORK FOR JAVA BASED AJAX WEB APPLICATIONS

FIELD OF THE INVENTION

The present invention relates generally to client-server computing systems, and more particularly to, a method and system for providing a Framework for Java Based Web applications using AJAX.

BACKGROUND

Description of the Related Art

The design and implementation of complex software is expensive. Much of the cost is in re-developing and re-inventing core concepts and components which are made more complex with the growing number of hardware architectures, diverse operating system and communication platforms. Some of the cost associated with software development have been mitigated with use of frameworks. Frameworks are playing a more important role in capturing the essence of the different architectures, components and programming mechanisms. Frameworks include a collection of tools and Application Programming Interfaces (APIs) that provide defined structure, generic services, tools and methods to simplify and accelerate software development. These tools and APIs are well tested, simple enough to be implemented and provide portability across multiple platforms. Generally, frameworks may include support programs, code libraries, scripting language, or other software to help develop and integrate the different components of a software application. Using standard development tools result in higher software quality and greater portability of the application thereby contributing to the success of a business. Other obvious advantages to using the frameworks is that the applications developed are more robust and an application developer does not have to have a deep understanding of the APIs and design patterns available in the frameworks in order to develop applications. Additionally, the use of frameworks often reduce the number of errors in a program by making the code more simple.

Several frameworks are available for developing web applications. Most of these frameworks that are available to a client-server computing system are server intensive with the controller, model and view all located on the server. Any event occurring on the client that would change the view or update the model data would require an HTTP request and response causing a trip to the server and the entire page to be reloaded at the client. The problem gets exacerbated when multiple events occur on a single webpage on the client resulting in multiple HTTP requests and responses and multiple page reloads at the client. This is not an effective use of networking or processing resources.

In view of the foregoing, there is a need for a method and system that will overcome the aforementioned problems by providing a framework that can manage client-side events, load and inject new content on the client dynamically, and interact with a server side set of components while effectively using network and processing resources.

SUMMARY

The present invention fills the need by providing a framework that is divided between a client and a server to manage client-side and server-side events. The framework includes a client-side controller in asynchronous communication with a server-side controller. The client-side controller manages the events on the client and forwards requests to the server-side controller. The server-side controller manages the events on the server and responds to the requests from the client-side controller. The data returned by the server-side controller are rendered on the client asynchronously as and when the data is received by the client-side controller. It should be appreciated that the present invention can be implemented in numerous ways such as a system or a method.

In one embodiment, the present invention includes a method for providing a controller framework divided between a client and a server for managing events associated with either the client or the server. The method includes initiating a request at the client. The request defines an event that is triggered at the client upon the initiation of the request. The triggered event is registered by a client event manager of a client controller on the client. The client event manager is configured to retrieve notifications related to the event from a server controller residing on the server upon registry of the event by the client event manager. The client event manager periodically polls the server controller for any notifications related to the event. The notifications from the server controller include data related to the event. An injection manager of the client controller, in communication with the server controller on the server and the client event manager on the client, loads the data related to the event retrieved from the server controller onto a browser of the client.

In another embodiment, a system for providing a controller framework divided between a client and a server for managing events associated with either the client or the server is described. The system, in this embodiment of the invention, includes a client controller on a client and a server controller on a server. The client controller, in turn, includes a client event manager and an injection manager. The client event manager of the client controller is configured to register an event on the client upon triggering of the event on the client, poll the server at periodic intervals for notifications related to the event upon registration of the event, and retrieve notifications related to the event from the server. The injection manager of the client controller is configured to communicate with the client event manager on the client and the server controller on the server, and to load the data retrieved from the server controller onto a browser of the client as and when data is received from the server controller. The server controller on the server is configured to receive and respond to the request related to the event from the client controller on the client. In this embodiment, the server controller communicates with an injection processor and an event processor. The injection processor is configured to manage client-side events and to receive data related to the event from a component through an injection command module based on at least one event parameter received from the client controller. The injection command module processes the request defining the client-side event before returning the data related to the event to the injection processor. The event processor manages the server-side event registered by the client event manager on the event listener at the client by forwarding the events to an event handler. The event processor is configured to receive the data related to the event from the event handler based on at least one event parameter received from the client processor on the client. The event handler processes the request defining the server-side event.

The present invention, thus, describes a method and system for providing a controller framework divided between the client and the server for managing events associated with either the client or the server. The present invention provides periodic updates at the client using asynchronous communication. The updates are loaded and new content rendered on the client dynamically thereby providing up-to-date information on the client without overloading the networking or processing resources.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

The present invention provides a controller framework divided between a client and a server for managing events associated with either a client or a server in a client-server computing system. The controller framework provides control logic on the client that may be used to interact with server-side control logic to dynamically load specific data on the client asynchronously from the server without the need for reloading of the whole page. Several embodiments for providing a controller framework divided between a client and a server for managing events associated with either the client or the server are described. It should be appreciated that the present invention can be implemented in different ways such as a system or a method. It will be apparent to those skilled in the art that the present invention may be practiced without some or all of the specific details set forth herein.

To facilitate an understanding of the embodiments, the general architecture and operation of a client-server computing system will be described first. The process of the disclosed embodiments will then be described in detail with reference to the general architecture. In the current application, browser, browser client and client are used interchangeably to refer to a client in a client-server computing system. A client is a computer or computing device that runs client software (referred to as a browser) to access the Internet and render content.

Figure 1:
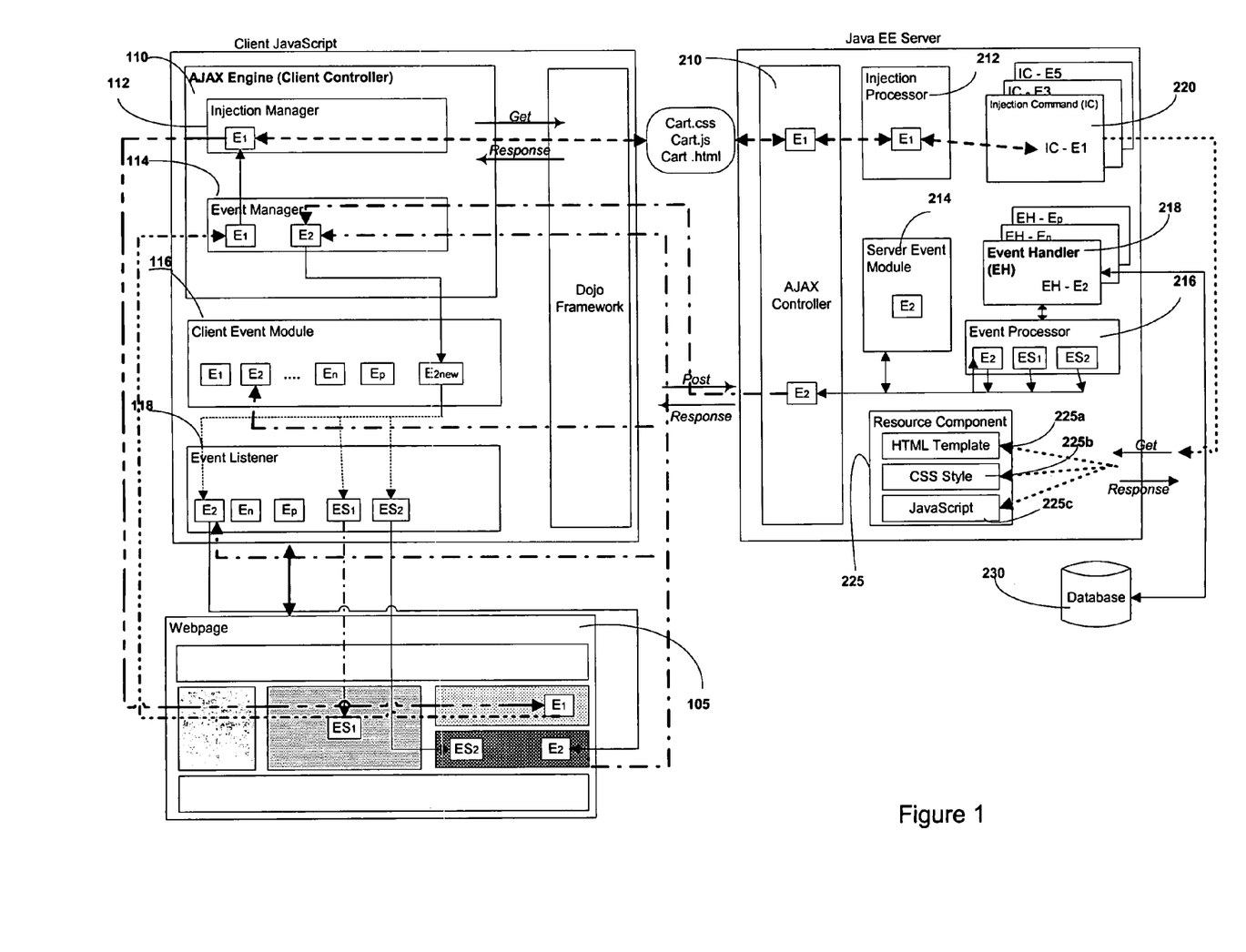
FIG. 1 illustrates an overview of a client-server computing system involved in providing a controller framework between a client and a server for managing events associated with either the client or the server, in one embodiment of the present invention.

FIG. 1 illustrates resource details that are involved in providing a controller framework, in one embodiment of the invention. A brief overview of the resources and operations involved in carrying out the invention is explained with a more detailed explanation to follow. In this embodiment, a plurality of computers or computing systems are interconnected using network connections (not shown). A client computer (client) 100 runs client software (referred to as a browser) and a server computer (server) 200 runs server software. The client 100 may include software in the form of an AJAX engine 110 on the browser. The AJAX engine 110, also referred to as a client controller 110, is JavaScript code that is installed on the browser of the client 100 and is made available to an application running on the client 100. In one embodiment, JavaScript is sometimes referred to in reference to the "ECMAScript". ECMAScript is available as "Standard ECMA-262: ECMAScript Language Specification", which is herein incorporated by reference. The JavaScript, of the embodiments of this invention, however, includes the client controller 110 that enables asynchronous requests to further enable asynchronous communication between the client 100 and the server 200. The client controller 110 is capable of interacting with other objects on the client 100 and with the server 200. The client controller 110 is configured to manage the events, poll the server for notifications periodically and load the data retrieved from the server 200 on the client 100 asynchronously. The loaded data is rendered on the client 100 dynamically without having to re-load the entire content.

The server 200 is equipped with an AJAX controller 210. The AJAX controller 210, also referred to as a server controller 210, is capable of interacting with other runtime scripts on the server 200 and with the client controller 110. The server controller 210 may be implemented using JAVA Servlet code, a JAVA Server Faces (JSF) code or any other technology so long as it is capable of interacting with other runtime scripts on the server 200 and with the client controller 110. The server controller 210 manages requests received from the client 100 and forwards them to appropriate runtime scripts running on the server 200 for further processing. The server controller 210 is configured to manage the events on the server 200 and return data associated with the events to the client controller 110 asynchronously in response to requests or upon poll originating from the client 100.

By providing a framework with client control logic in the form of a client controller 110 on the client 100 interacting with a server controller 110 on the server 200 using asynchronous communications, an effective mechanism to update specific data on the client without having to re-load the entire content on the client 100 is provided. This is especially useful in instances where more than one data has been modified on the client 100. Using this mechanism, only affected data are uploaded resulting in effective use of the network and processing resources while maintaining the integrity of the data on the client in an efficient and effective manner. The framework can be used by a programmer to create a custom application with intense client-side interactions without having to possess in-depth knowledge of the objects that make up the framework.

A detailed overview of a system and system resources involved in carrying out the present invention will now be described with reference to FIG. 1. A client 100, in the client-server computing system illustrated in FIG. 1, may include software in the form of an AJAX engine 110 on the browser. The AJAX engine 110, also referred as a client controller 110, is a JavaScript code that is installed on the browser of the client 100 and is made available to an application running on the client 100. The JavaScript code of the client controller 110 includes asynchronous requests to enable asynchronous communication between the client 100 and a server 200. The client controller 110 is configured to manage events related to an application executing on the client 100, poll the server for notifications periodically and load the data retrieved from the server 200 onto the client 100 asynchronously. The client controller 110 includes a runtime script in the form of a client event manager 114 to manage events originating on the client 100 and obtain status of events originating on the client 100 and on the server 200 to which the application is interested in receiving updates. As used herein, the term "script" should be broadly understood to include any type of program code which can be executed by one or more computing systems. The client event manager 114, in one embodiment of the invention, is a JavaScript object that is capable of interacting with the server 200 and with other objects on the client 100 including JavaScript objects. The client event manager 114 is configured to register the event on the client 100, poll the event on the server 200 periodically, retrieve notifications related to the event asynchronously from the server 200 when notifications are available on the server 200, and interact with other objects on the client 100. The client event manager 114 registers the event by creating an event holder in a client event module 116 on the client 100. The client event module 116 is a repository of events that the application executing on the client 100 at any given time. The notifications related to the event include data related to the event.

The client controller 110 also includes a script in the form of an injection manager 112 that allows code and content data retrieved from the server 200 to be loaded on the client 100 asynchronously on an as needed basis. The injection manager 112 is configured to interact with other script objects on the client 100 such as the client event manager 114, and with the server 200. In one embodiment of the invention, the injection manager 112 is a JavaScript object that is capable of interacting with other script objects on the client and with the server 200.

In addition to the client controller 110, the client 100 includes a script in the form of an event listener 118. The event listener 114 is capable of interacting with other objects on the client 100 including the client event manager 114 of the client controller 110 on the client 100. In one embodiment of the invention, the event listener 118 is a JavaScript object. The event listener 114 holds events that the application is interested in receiving information and may include events registered by the client event manager 114 and events executing on the server 200. The event listener 114 further includes functions that may be used to set property for the events available on the event listener 114 in order to receive notifications on the events based on set properties.

The server 200, in the client-server computing system illustrated in FIG. 1, includes an AJAX controller 210 that is capable of receiving requests, including asynchronous requests for content related to one or more events, from various clients 100 and can direct these requests to one or more server runtime scripts or programs. The server controller 210 may be implemented using JAVA Servlet code, a JAVA Server Faces (JSF) code or any other technology so long as it is capable of interacting with other runtime scripts on the server 200 and with the client controller 110. The AJAX controller 210, also referred to as server controller 210, manages server side events and commands received from the client 100, including data update commands, and returns any data to the client 100. The server controller 210 registers the event on the server 200 by creating an event holder in a server event module 214 on the server 200. The server event module 214 on the server 200 is a repository of events that the server 200 is processing at any given time to which the event listener on the client 100 has expressed interest in receiving information.

The server 200 also includes a runtime script in the form of an injection processor 212. The injection processor 212 may be implemented using a Java code or a JavaScript code. The injection processor 212, in one embodiment, is a Java code. The injection processor 212 is configured to receive commands originating from the client controller 110 through the server controller 210 and delegate these commands or method binding specified by these commands to a command interface in the form of an injection command 220. The injection processor 212 is further configured to pool all instances of commands and return a consolidated response to the server controller 210 in reply to the request from the client controller 110. The injection command 220 is configured to process the commands and provide easy access to Application Programming Interfaces (APIs) such as method bindings in components. It is to be noted that the injection command 220 may be specific to a specific event. A plurality of injection command 220, each injection command 220 associated with an event, may be interacting with the injection processor 212 to provide data related to one or more events. The injection command 220 interacts with a resource component 225 on the server 200 to receive static resources and dynamic resources to process the request. The static resources may include style sheets and JavaScript code that provide the style and format for data returned to the client 100 to enable rendering of the data on the client 100. In an embodiment of the invention, the static resource includes cascading style sheets 225b and JavaScript code 225c related to the event. The dynamic resource may include code and data related to the event. In one embodiment, the dynamic resource includes the HTML code 225a and data related to the event.

The server 200 further includes a runtime script in the form of an event processor 216. The event processor 216 may be implemented using a Java code or a JavaScript code. The event processor, in one embodiment of the invention, is a Java code object that is capable of interacting with other runtime script objects on the server 200 including the server controller 210. The event processor 216 is configured to listen for events on the server 200 that are related to the request from the client 100 and notify the server controller 210 as soon as the event is executed on the server 200 in response to the request or upon a poll from the client controller 110. The event processor 216 is further configured to update data on the server 200 and manage other server side events that may occur outside of the request from the client 100 for which the event listener 118 on the client 100 has expressed interest and pool all the events together into a response to be returned to the server controller 210 in reply to the request from the client controller 110. The event processor 216 manages these events by interacting with an event handler 218 on the server 200. The event handler 218 is configured to process the events, update and retrieve data. It is to be noted that the event handler 218 may be specific to a specific event and a plurality of event handlers 218, each associated with an event, may be interacting with the event processor 216 to provide data related to one or more events to the event processor 216. The event handler 218 may use a database 230 available to the server 200 to update and retrieve data related to the event. The database 230 maybe resident on the server 200 or available to the server 200 through a network (not shown).

It is noteworthy that the present invention is not limited to the architecture of FIG. 1. For example, hand-held computers, notebook or laptop computers, set-top boxes or any other computing system (wired or wireless) capable of connecting to the Internet and running computer-executable process operations, as described below, may be used to implement the various aspects of the present invention. Additionally, the software program, in general, should be viewed as pieces of code, and such code can be written in other languages so long as its functionality enables the process operations of the present invention.

Figure 2:
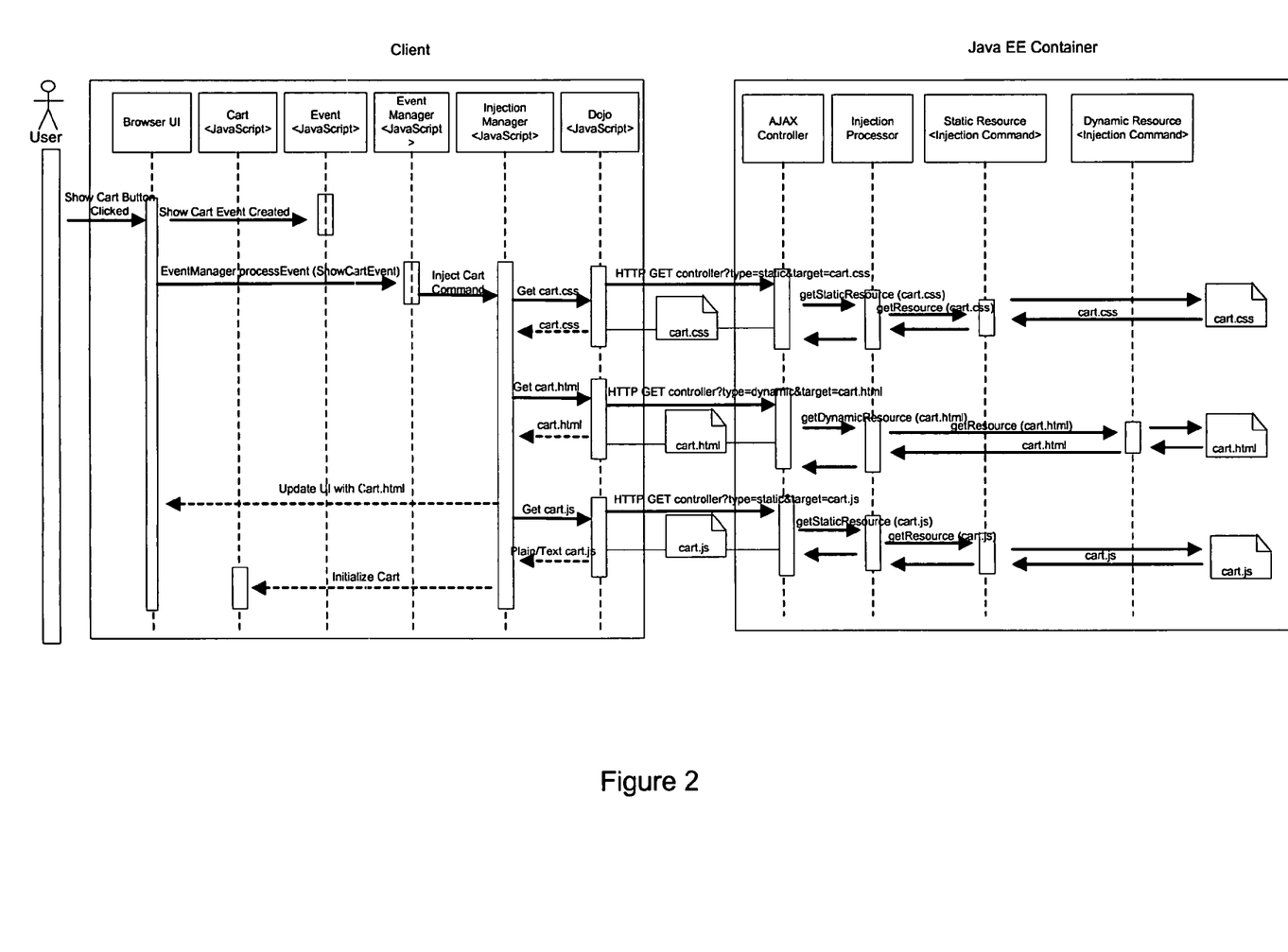
FIG. 2 illustrates the sequence diagram involved in executing a show command, in one embodiment of the invention.

The operational details of an embodiment of the present invention using the resources available on the client 100 and the server 200 described with reference to FIG. 1, are now discussed with reference to FIG. 2. FIG. 2 illustrates the sequence logic of a "show" command executed at the client 100. An application executing on a client 100 renders a webpage 105 on the client 100. The webpage 105 rendered on the client 100 may include different types of data including a text, a picture, a graphic user interface, a video, an audio or any combinations thereof. It should be noted that the types of data available on a webpage are not restricted to the ones listed above but may contain other forms so long as they may be rendered on a webpage and accessed. A request for showing a feature of the webpage is initiated on the client 100. The feature could be an option available on the webpage that is not yet rendered on the client 100. In one embodiment of the invention illustrated in FIG. 2, the feature could be a shopping cart and the request could be to show the shopping cart on the client 100. The press of a button, such as a "show shopping cart" button on the client 100, may initiate the show request, for example. The request triggers an event, such as an 'onkeypress' or an 'onkeyrelease', related to the request on the client 100. The event includes a plurality of event parameters that identify the event and a server 200 to which the event is mapped. The event parameters may include a Universal Resource Locator (URL) of the server 200, an event identification, event description, and event data. A client event manager 114 on the client 100 processes the event by registering the event on the client 100. A showcart event is created on a client event module 116, in response to the registering of the event by the client event manager 114, as illustrated in FIG. 2. The event is forwarded by the client event manager 114 to an injection manager 112 as an inject cart command.

The injection manager 112 interprets the inject cart command and makes HTTP GET request to the server 200. The HTTP GET request includes a request for static resources and dynamic resources from the server 200. The static resources may include the style and format for the feature to be rendered on the client 100 and the dynamic resource may include the dynamic code and the data associated with the event. In this embodiment, the static resource may include cart.css (the cascading style sheet that defines the layout style) and cart.js (the JavaScript that defines the format) and the dynamic resource may include cart.html (the dynamic html code) and data associated with the event.

The injection manager 112 makes a HTTP GET request to a server controller 210 on the server 200 through a network (not shown). An optional server communication framework interface, such as Dojo framework, may be used to manage the communication with the server 200. The server communication framework is a platform independent communication mechanism that may be used on the client 100 or on the server 200 to abstract any browser differences that may exist during the communication between the client controller 110 and the server 200. In one embodiment illustrated in FIG. 1, the server communication framework, in the form of Dojo framework, is used on the client 100. Other server communication framework may be used so long as the framework is able to abstract any browser differences that may exist during the communication between the client controller 110 and the server 200.

The server 200 receives the HTTP GET request from the injection manager 112 of the client controller 110 and forwards the request to an injection processor 212 on the server 200. The injection processor 212 identifies the appropriate injection command 220 that can service the request and forwards this request to the identified injection command 220. The injection command 220 identifies the appropriate static resources, showcart.css 225*b* and showcart.js 225*c*, and dynamic resources, showcart.html 225*a*, to service the request on a resource component 225 on the server 200 and extracts and forwards the identified static and dynamic resources to the injection processor 212 in response to the request. The injection processor 212 pools the injection command instances into a single response for each of the static and dynamic resources and returns each of the pooled responses to server controller 210. The server controller 210 forwards each of the pooled response asynchronously to the client controller 110 on the client 100. In one embodiment where the Dojo framework is available on the client 100, the server controller 210 forwards the response asynchronously to the client controller 110 through the Dojo framework mechanism. The injection manager 112 of the client controller 110 on the client 100 uses the static resource in the response to initialize the request associated with the event and the dynamic resource is used to upload the data and the code associated with the data for the request. The data, style and format for the request associated with the feature are rendered on the webpage 105 asynchronously, as illustrated in FIG. 2. The server communication framework may be either used to poll the server or use server-side push mechanisms for updates to the client. In one embodiment of the invention where the Dojo framework is on the client 100, the server controller 210 is polled periodically by the client event manager 114 for additional updates and notifies the injection manager 112 when these updates are available. In another embodiment of the invention where the Dojo framework is on the server 200, the Dojo framework uses the server-side push mechanism to send updates to the client 100 where the injection manager 112 is notified. The injection manager 112 receives these updates from the server controller 210 as and when they are available and renders them asynchronously at the client 100.

Figure 3:
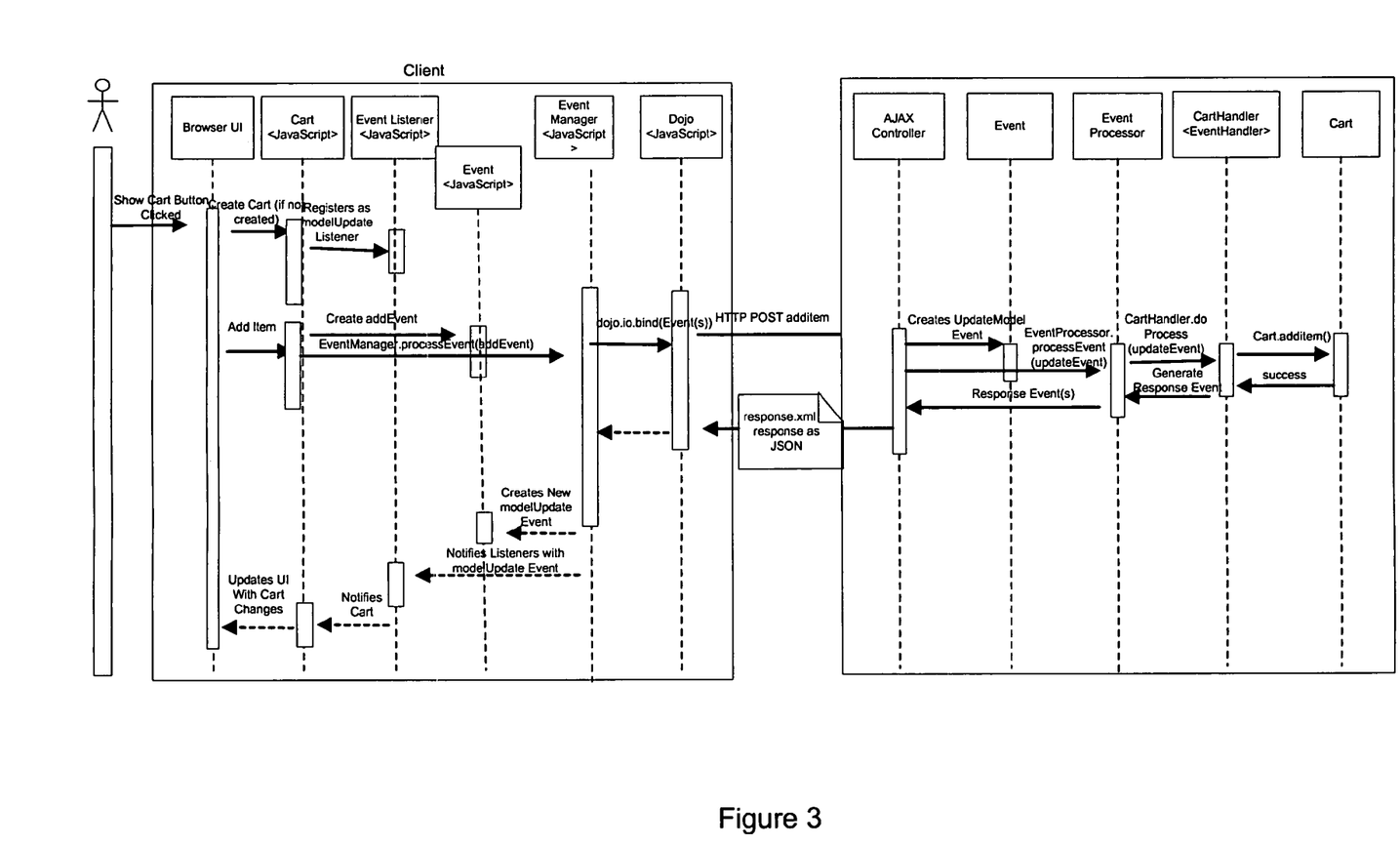
FIG. 3 illustrates the sequence diagram involved in executing an update command, in one embodiment of the invention.

FIG. 3 illustrates sequence logic of an update command executed at the client 100, in one embodiment of the invention. In this embodiment, a request for updating a portion of a webpage is initiated on the client 100. In the embodiment of the invention illustrated in FIG. 3, the request could be to update a shopping cart on the client 100. The press of a button, such as an "update shopping cart" button, may initiate the update request, for example. The update request triggers an event, such as an 'onkeyupdate', related to the request on the client 100. The event includes a plurality of event parameters that identify the event and a server 200 to which the event is mapped. The event parameters may include a Universal Resource Locator (URL) of the server 200, an event identifier, event description and event data. If a webpage related to the event is not yet rendered on the client 100, the webpage is created and rendered on the client 100. A client event manager 114 registers the event on the client 100. An 'addtocart' event is created on a client event module 116 and on an event listener 118, in response to the registering of the event by the client event manager 114, as illustrated in FIG. 3. The entry on the event listener 118 indicates that the client controller 110 is interested in receiving any update information related to the event from the server 200 upon execution of the event at the server 200. The client event manager 114 forwards the event to a server controller 210 on the server 200 through the network (not shown) as a HTTP POST command. In one embodiment, the client event manager 114 forwards the event through an optional Dojo framework. The Dojo framework is a platform independent communication mechanism available on the client 100 used to abstract any browser differences that may exist during the communication between the client controller 110 and the server 200. The client event manager 114 of the client controller 110 begins polling the server controller 210 periodically for response to the event upon forwarding the event to the server controller 210.

The server controller 210 on the server 200 receives the HTTP POST command for the update event with the event parameters and registers the event on a server event module 214. The server controller 210 then forwards the event to an event processor 216 for processing of the event on the server 200. The event processor 216 processes the event by identifying an event handler 218 specific to the event to service the event. The event handler 218 updates any data related to the event received through event parameters on the server 200 and returns data related to the event to the event processor 216 in response to the request. The event handler 218 interacts with a database 230 available to the server 200 to update and retrieve any data related to the event. The event processor 216 pools all the event data into a pooled response that is forwarded to the server controller 210 on the server 200. The event data that the event processor 216 pools together may include data from other events that are run outside of the request initiated from the client 100 at that time. These other events include events that may be running on the server 200 that the event listener on the client 100 has shown interest to receive information. The server controller 210 returns the pooled response to the client event manager 114 in reply to the request or upon a poll. In one embodiment, the pooled response from the server controller 210 is returned as an XML response. In another embodiment, the response from the server controller 200 is returned as a JavaScript Object Notation (JSON) response. Upon receipt of the response for the update request or upon a poll from the client 100, the client event manager 114 notifies the event in the client event module 116 and the event listener 118. The client event listener 118 updates the HTML Document Object Model (DOM) of the webpage with the updated data using JavaScript DOM and Dynamic HTML (DHTML) application programming interfaces (API) and renders the updated feature on the client 100 dynamically without reloading the whole webpage.

Figure 4:
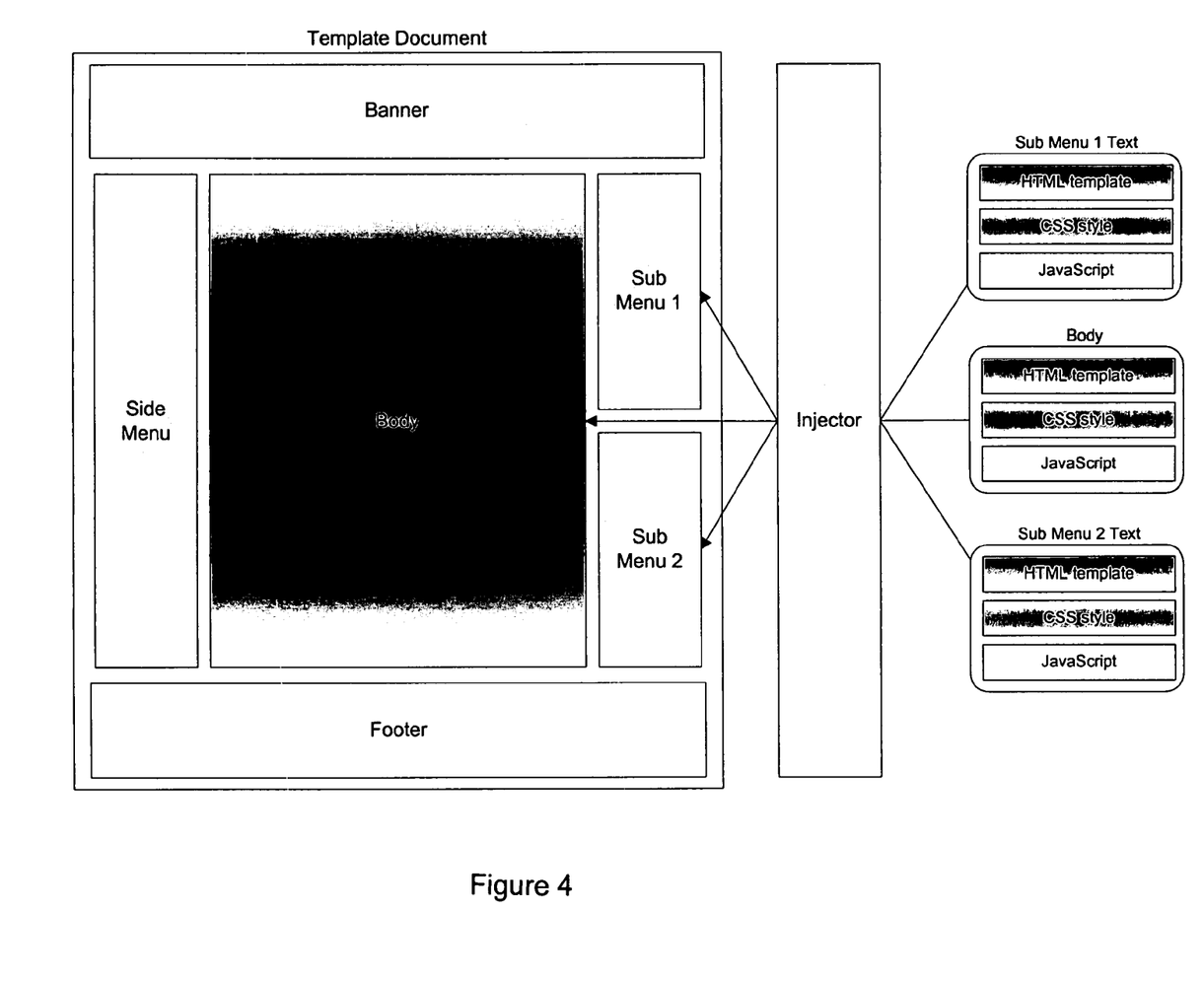
FIG. 4 illustrates a template document and template injection operation carried out by an injection manager, in one embodiment of the invention.

The update or the show response retrieved from the server 200 in response to a request or upon a poll may include portions of the webpage rendered on the client 100. FIG. 4 illustrates an example of how the framework provides data to the webpage rendered on the client 100 asynchronously on an as-needed basis, in one embodiment of the invention. In this embodiment, the webpage includes a plurality of sub-units. Each of the sub-units may represent a single data type or a combination of data types. The data types may include text, picture, video, graphics, audio or any combinations thereof. In this embodiment, when the webpage 105 is initially rendered on the client 100, a portion or portions of content of the webpage along with templates of one or more sub-units are rendered. The remaining contents corresponding to the templates associated with one or more of the sub-units may be loaded on an as-needed basis. For example, in the embodiment illustrated in FIG. 4, the Banner sub-unit, Side Menu sub-unit and a Footer sub-unit may be rendered during the initial load with the style and content of the Body sub-unit, Sub Menu 1 sub-unit and Sub Menu 2 sub-unit rendered on an as-needed basis. An injection manager 112 will assist in rendering the style and contents of the Body, Sub Menu 1 and Sub Menu 2 sub-units using the static and dynamic resources related to these sub-units retrieved from the server 200 as and when an event related to these sub-units are triggered at the client 100, as illustrated in FIG. 4. In this embodiment, the injection manager 112 of the client controller 110 may retrieve the static and dynamic resource for each of the sub-units independent of each other and load and render the static and dynamic resources individually on to the client 100 as and when they are retrieved.

Figure 5:
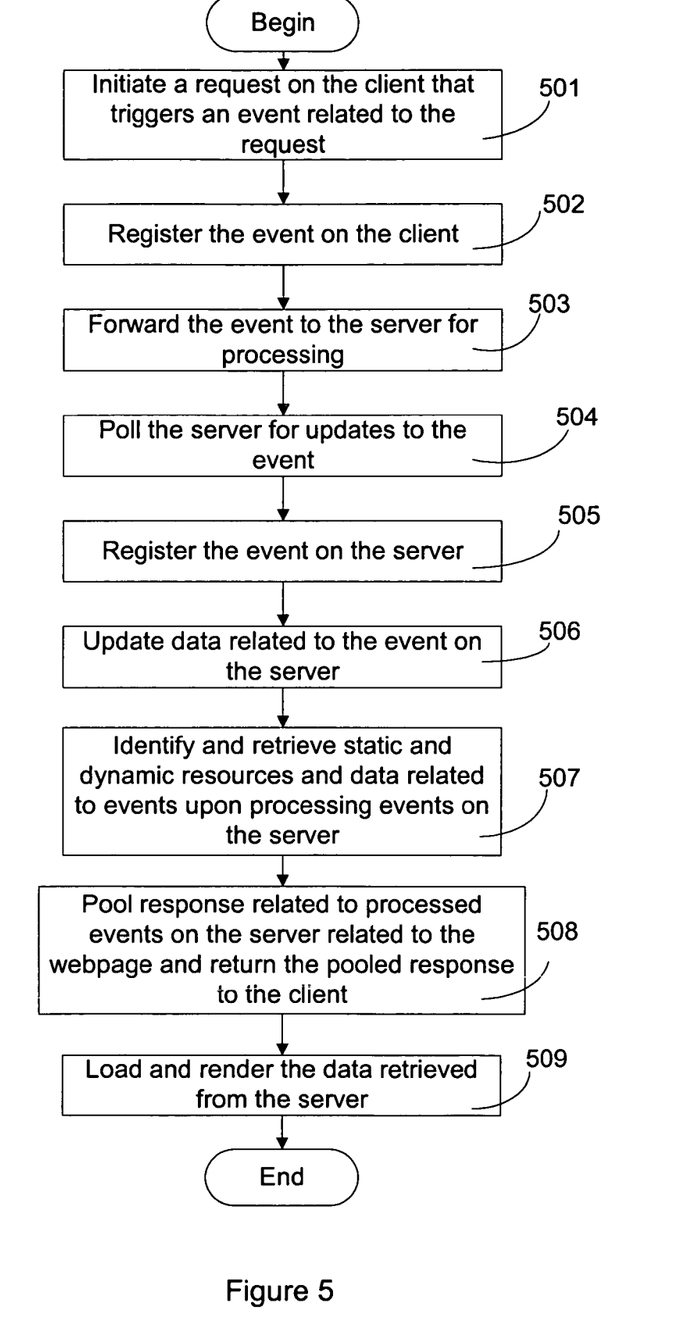
FIG. 5 illustrates a flow chart of the operations involved in providing a controller framework between a client and a server for managing events associated with either the client or the server, in one embodiment of the invention.
Figure 6:
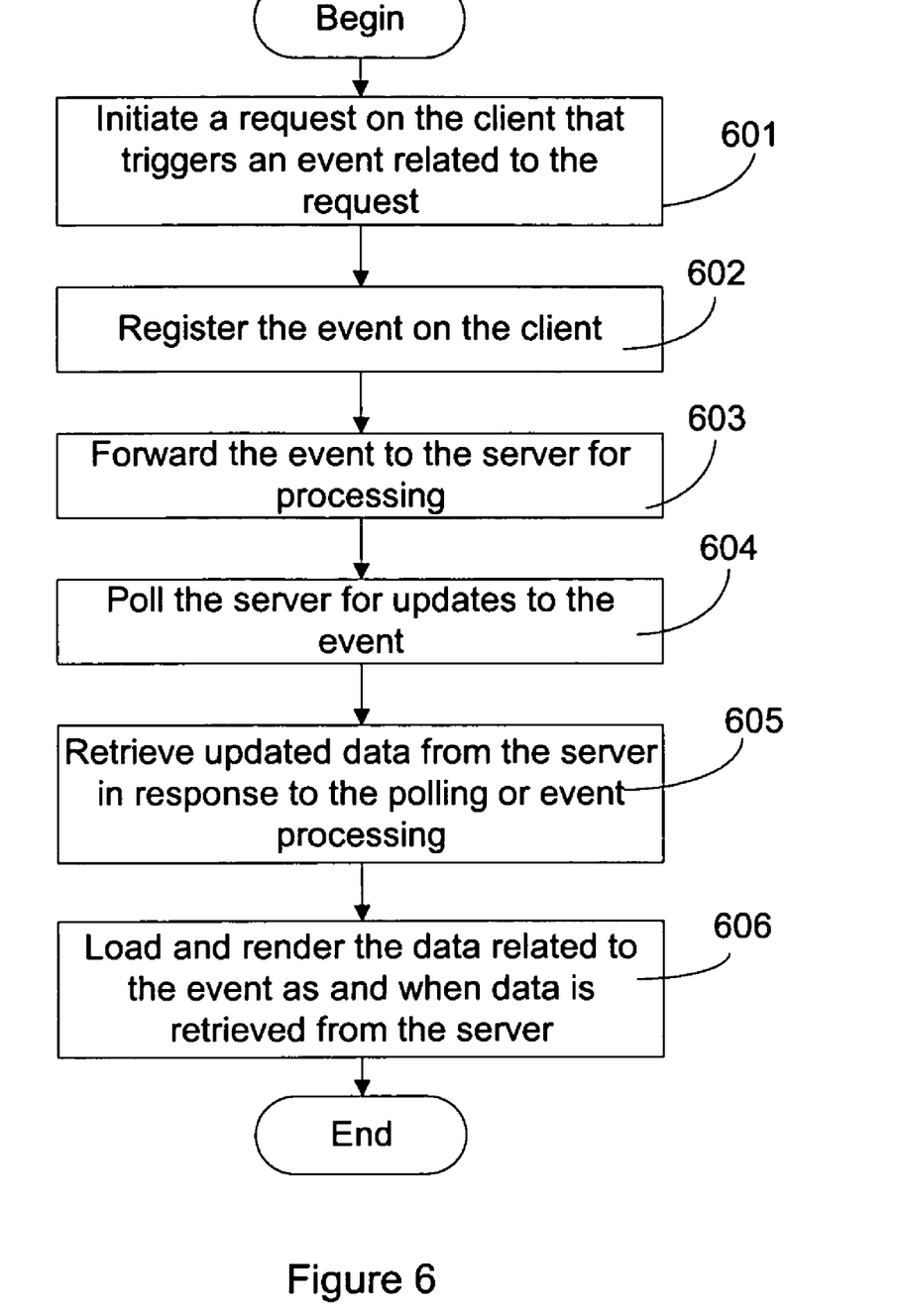
FIG. 6 illustrates a flow chart of operations on a client-side involved in providing a controller framework for managing events associated with either the client or the server, in one embodiment of the invention.
Figure 7:
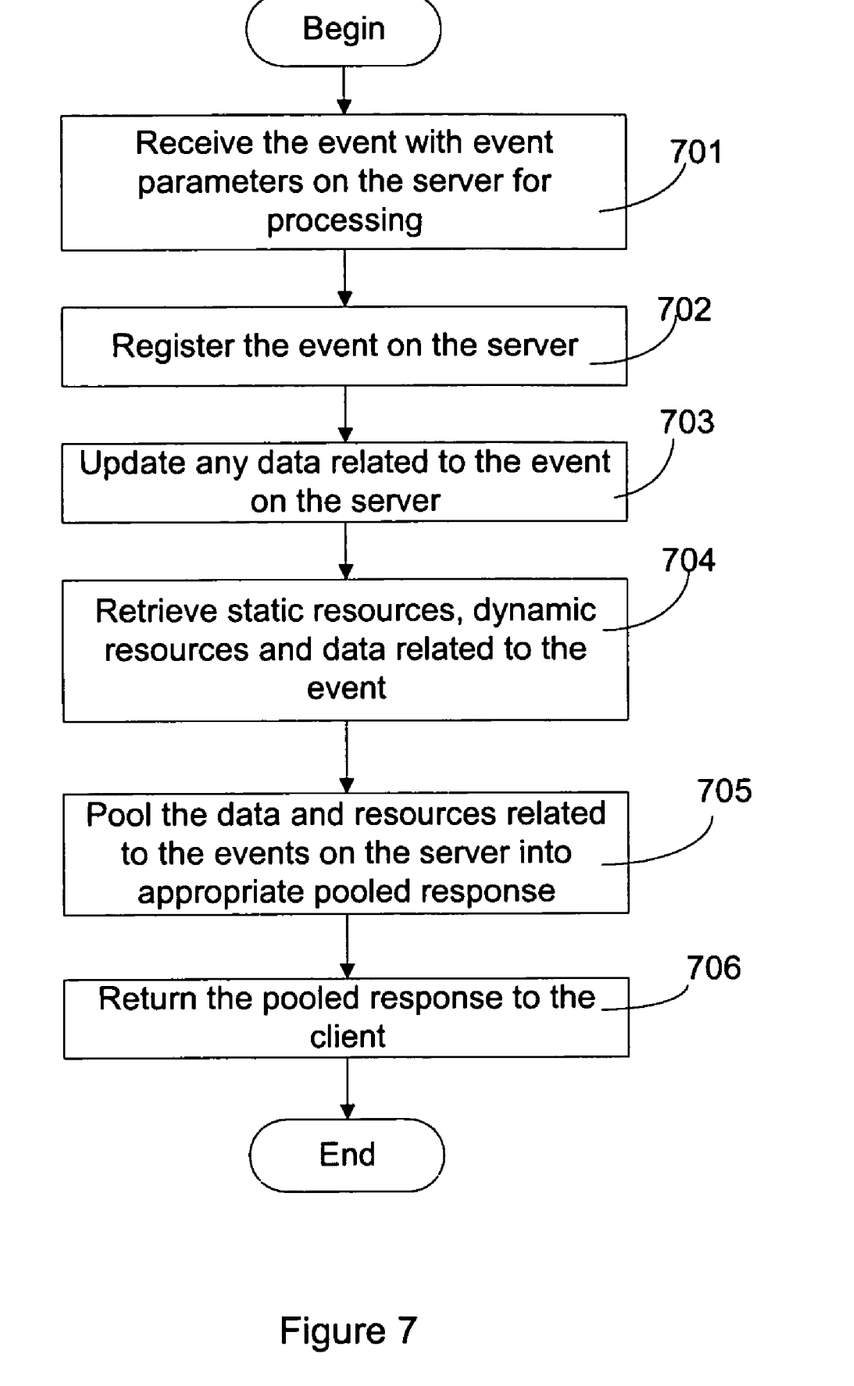
FIG. 7 illustrates a flow chart of operations on a server-side involved in providing a controller framework for managing events associated with either the client or the server, in one embodiment of the invention.

The method for providing a controller framework divided between the client and the server is now described in detail with reference to flow charts illustrated in FIGS. 5, 6, and 7. FIG. 5 illustrates the process operation involved in one embodiment of the invention. FIG. 6 illustrates the client-side operations involved in one embodiment of the invention. FIG. 7 illustrates the server-side operations involved in one embodiment of the invention.

The method begins at the client 100 when a request is initiated to show or update a feature on a webpage 105 rendered on the client 100, as shown in operation 501 of FIG. 5. The feature could include a portion of a webpage 105 that has not yet been rendered or that has been updated. The request from the client 100 could include a key such as an address to a server 200 in the form of a Uniform Resource Locator (URL) along with a plurality of event parameters that are used in identifying the event. The request triggers an event related to the request on the client 100. Upon triggering of the event, the event is registered on the client 100 by a client event manager 114, as shown in operation 502. This could include creating an event entry in a client event module 116 and an event listener 118. The entries in the event listener 118 are used by the client event manager 114 to poll the server 200 for any updates during the execution of the application that has rendered the webpage 105 on the client 100. The client event manager 114 forwards the event along with one or more event parameters to a server 200 to which the event is mapped based on the event parameters, as shown in operation 503. Upon forwarding the event to the server 200, the client event manager 114 may start polling the server 200 for any response, as shown in operation 504. Communication between the client event manager on the client 100 and the server 200 are done asynchronously.

The server 200 receives the event along with the event parameters and registers the event on a server event module 214, as shown in operation 505. The entries in the server event module 214 define the events that may be currently running on the server 200. Depending on the event and event parameters passed to the server 200, a server controller 210 on the server 200 may direct the event to an injection processor 212 for processing or to an event processor 216 for processing. If the event is for showing a feature on the client 100, the event is directed to the injection processor 212. If the event is for updating a feature on the client 100, the event is directed to the event processor 216. In the case of updating a feature on the webpage rendered on the client 100, the event parameters may include data for update on the server 200. In such case, the data is updated on the server 200 using the event processor 216, as illustrated in operation 506. The event parameters are used to request static resources, dynamic resources and data related to the event. The data and resources related to the webpage are identified and retrieved from the event processor 216 and injection processor 212 and returned to the server controller 210, as shown in operation 507. The injection processor 216 and event processor 216 pool the data and resources related to events that are associated with the event or related to the application executing on the client 100 and returns the pooled response to the server controller 210. The server controller 210 returns the pooled response to the client 100 related to the application running the webpage as a response to the request or upon a poll, as shown in operation 508. The client event manager 114 upon receiving the response, loads the appropriate data on the webpage and renders the webpage with updated data, as shown in operation 509.

The client side operations are illustrated in FIG. 6. The client side operations begin with a request initiated on a webpage rendered on the client 100, as illustrated in operation 601 of FIG. 6. An event is triggered on the client 100 in response to the request. The event is registered at the client 100 using a client event manager 114, as shown in operation 602. The client event manager 114 creates entries on a client event module 116 and event listener 118. The entries in the event listener 118 are used to receive updates periodically from the server 200. If the request is for showing a feature on the client 100, the client event manager 114 forwards the event to an injection manager 112 on the client 100. The client event manager 114 or the injection manager 112 forwards the event to a server 200 to which the event is mapped for processing, as shown in operation 603. In one embodiment, the client event manager 114 may then start polling the server 200 for event updates, as shown in operation 604. In another embodiment, the client event manager 114 may receive the event updates from the server 200 through a server communication framework, such as Dojo located on the server 200. The server 200 receives the event with event parameters, processes the events and returns a pooled response to the client 100. The client event manager 114 or the injection manager 112 retrieves the pooled response, as shown in operation 605. The client event manager 114 updates the events on the client event module 116 and the event listener 118 with the updated response depending on the type of event. The event listener 118, in the case of update event, or the injection manager 112, in the case of a show event, updates the HTML DOM of the webpage using updated event data using JavaScript DOM and DHTML application programming interfaces (API) and renders the updated data.

The server side operation begins when an event is received at a server 200 that is mapped to the client 100, as shown in operation 701. The event originates on the client 100 and includes event parameters that indicate the type of event to be processed. The type of event that may need processing include one of a show event, to view a feature on the webpage rendered on the client 100, or an update event, to update one or more data related to the webpage. When the event is received at the server, a server controller 210 directs the event to one of a plurality of runtime scripts on the server 200. If the event is a show event, the server controller 210 forwards the request to an injection processor 212. If the event is an update event, the server controller 210 registers the event on a server event module 214, as shown in operation 702, and forwards the request to an event processor 216. If the event parameters include any data that needs to be updated on the server 200, the event processor forwards the event for processing to an appropriate event handler 218. The event handler 218 updates the data on to a database 230 available to the server 200, as shown in operation 703. The event handler 218 processes the event, that may include retrieving data from the database 230, and returns any updated data in a response to the event processor 216, as shown in operation 704. The event processor 216 pools responses received from the event handler 218 and forwards pooled response to the server controller 210, as shown in operation 705. It should be noted that more than one event handler 218 may be used to service an event and more than one event handler 218 may return data to the event processor 216 at any given time. Similarly, the injection processor 212 forwards the event to an appropriate injection command 220 to process the event. The injection command identifies and retrieves one or more static resources and dynamic resources that are needed to process the event from a resource component 225 on the server 200, as shown in operation 704. The identified static resources and dynamic resources are returned to the injection processor 212 in response to the event. It should be noted that more than one injection command 220 may be used to service an event. The injection processor 212 pools the response received from corresponding injection commands 220 and returns the pooled response to the server controller 210, as shown in operation 705. The server controller 210 forwards the response to the client controller 110 on the client 100 as an XML or JSON response, as shown in operation 706. The server side operation concludes upon the return of the data to the client 100.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing a controller framework divided between a client and a server for managing events associated with either the client or the server, comprising:
    initiating a request at the client, the request defining an event;
    registering the event by a client event manager of a client controller on the client, the client event manager configured to retrieve notifications related to the event from a server controller on the server upon registry of the event by the client event manager;
    polling the server controller on the server at periodic intervals for notifications related to the event, the polling of the event performed by the client event manager at the client upon registration of the event at the client event manager, the notifications including data related to the event; and
    loading the data related to the event onto a browser of the client using an injection manager that is part of the client controller, the injection manager being in communication with the client event manager on the client and with the server controller on the server.

2. A method for providing a controller framework divided between a client and a server for managing events associated with either the client or the server of claim 1, wherein initiating a request further comprising:
    identifying an event that needs to be triggered on the client; and
    executing the event at the client, the execution resulting in the request defining the event to be presented to the server controller on the server.

3. A method for providing a controller framework divided between a client and a server for managing events associated with either the client or the server of claim 1, wherein registering the event by the client event manager is by adding an entry to a client event listener module, the client event listener module configured to receive notifications when the registered event is executed at the server.

4. A method for providing a controller framework divided between a client and a server for managing events associated with either the client or the server of claim 3, wherein the event is any one of a client-side event or a server-side event.

5. A method for providing a controller framework divided between a client and a server for managing events associated with either the client or the server of claim 1, wherein the request includes one or more event parameters to identify the event on the server.

6. A method for providing a controller framework divided between a client and a server for managing events associated with either the client or the server of claim 5, wherein the event parameter defining the event at the client and the server includes anyone or more from a group consisting of Universal Resource Locator to the server, event identification, event description, and event data.

7. A method for providing a controller framework divided between a client and a server for managing events associated with either the client or the server of claim 1, wherein the polling of the server controller is done asynchronously.

8. A method for providing a controller framework divided between a client and a server for managing events associated with either the client or the server of claim 1, wherein the event notifications at the server controller on the server are obtained through an injection processor on the server, the injection processor managing client-side event, the injection processor configured to receive the data related to the event from a component on the server through an injection command module on the server based on at least one event parameter received from the client, the injection command module configured to process the request defining the client-side event.

9. A method for providing a controller framework divided between a client and a server for managing events associated with either the client or the server of claim 1, wherein the event notifications at the server controller on the server are obtained through a event processor on the server, the event processor managing server-side event registered at the client event manager, the event processor configured to receive the data related to the event from an event handler on the server based on at least one event parameter received from the client, the event handler configured to process the request defining the server-side event.

10. A method for providing a controller framework divided between a client and a server for managing events associated with either the client or the server of claim 1, wherein the data received at the client is for at least one sub-unit of a template, each of the sub-units capable of being returned to the client independent of each sub-unit in response to the polling of the server controller on the server.

11. A method for providing a controller framework divided between a client and a server for managing events associated with either the client or the server of claim 10, wherein each sub-unit of the template includes a static resource and a dynamic resource.

12. A method for providing a controller framework divided between a client and a server for managing events associated with either the client or the server of claim 11, wherein the static resource includes a style sheet and a JavaScript and the dynamic resource includes a html template.

13. A method for providing a controller framework divided between a client and a server for managing events associated with either the client or the server of claim 10, further including rendering one or more sub-units of the template on the client asynchronously upon receipt of the data at the client.

14. A system for providing a controller framework divided between a client and a server for managing events associated with either the client or the server, comprising:
    a client controller on the client, the client controller including:
        a client event manager configured to: a) register an event on the client, the event being triggered on the client in response to a request initiated on the client, the event defined using at least one event parameter, b) polling the server at periodic intervals for notifications related to the event upon registration of the event, the notifications including data related to the event, c) retrieving notifications related to the event from the server; and
        an injection manager configured to load the data retrieved from the server onto a browser of the client, the injection manager being in communication with the client event manager on the client and with the server;
    and
    a server controller on the server, the server controller configured to receive and respond to the request from the client controller on the client, the server controller in communication with:
        an injection processor, the injection processor configured to: a) manage client-side events, b) receive data related to the event from a component through a command module based on at least one event parameter received from the client controller, the command module processing the request defining the client-side event; and an event processor, the event processor managing server-side event registered by the client event manager on the event listener at the client, the event processor configured to receive the data related to the event from an event handler on the server based on at least one event parameter received from the client processor on the client, the event handler configured to process the request defining the server-side event.

15. A system for providing a controller framework divided between a client and a server for managing events associated with either the client or the server of claim 14, wherein processing the request further comprising updating data related to the event on the server, the data being received from the client controller in the form of one or more event parameters.

16. A system for providing a controller framework divided between a client and a server for managing events associated with either the client or the server of claim 14, wherein the client controller is in asynchronous communication with the server controller.

17. A system for providing a controller framework divided between a client and a server for managing events associated with either the client or the server of claim 14, wherein the data received at the client controller includes at least one of a static resource and a dynamic resource.

* * * * *